US009005799B2

(12) United States Patent
Khakhalev

(10) Patent No.: US 9,005,799 B2
(45) Date of Patent: Apr. 14, 2015

(54) BATTERY MODULE AND METHODS FOR BONDING CELL TERMINALS OF BATTERY CELLS TOGETHER

(75) Inventor: Alex Khakhalev, Troy, MI (US)

(73) Assignee: LG Chem, Ltd., Seoul (KR)

(*) Notice: Subject to any disclaimer, the term of this patent is extended or adjusted under 35 U.S.C. 154(b) by 165 days.

(21) Appl. No.: 12/868,111

(22) Filed: Aug. 25, 2010

(65) Prior Publication Data
US 2012/0052364 A1 Mar. 1, 2012

(51) Int. Cl.
H01M 2/22 (2006.01)
H01M 2/20 (2006.01)
H01M 2/30 (2006.01)

(52) U.S. Cl.
CPC ............. *H01M 2/204* (2013.01); *H01M 2/20* (2013.01); *H01M 2/22* (2013.01); *H01M 2/202* (2013.01); *H01M 2/30* (2013.01)

(58) Field of Classification Search
CPC ......... H01M 2/20; H01M 2/22; H01M 2/202; H01M 2/204; H01M 2/30
USPC ............... 219/121.63; 228/121; 429/156, 181
See application file for complete search history.

(56) References Cited

U.S. PATENT DOCUMENTS

| | | | |
|---|---|---|---|
| 2,273,244 A | 2/1942 | Ambruster | |
| 3,140,859 A | 7/1964 | Scarpa | |
| 3,164,711 A * | 1/1965 | Shetterly | 219/93 |
| 3,179,538 A * | 4/1965 | Dalin | 429/181 |
| 3,503,558 A | 3/1970 | Galiulo et al. | |
| 3,522,100 A | 7/1970 | Lindstrom | |
| 3,640,775 A * | 2/1972 | Fitchman et al. | 429/161 |
| 4,098,966 A * | 7/1978 | Brown | 429/161 |
| 4,292,381 A * | 9/1981 | Klein | 429/120 |
| 4,294,392 A | 10/1981 | Colloff | |
| 4,390,841 A | 6/1983 | Martin et al. | |
| 4,396,689 A | 8/1983 | Grimes et al. | |
| 4,409,304 A * | 10/1983 | Gerard et al. | 429/158 |
| 4,423,123 A * | 12/1983 | Okamatsu | 429/160 |

(Continued)

FOREIGN PATENT DOCUMENTS

| | | |
|---|---|---|
| CN | 1512518 A | 7/2004 |
| EP | 0736226 B1 | 3/1999 |

(Continued)

OTHER PUBLICATIONS

Chinese Office Action dated Dec. 7, 2007 for Chinese Patent Application No. 200480025941.5 (PCT/KR2004/002399).

(Continued)

*Primary Examiner* — Yogendra Gupta
*Assistant Examiner* — Emmanuel S Luk
(74) *Attorney, Agent, or Firm* — Bruckert Patent & Trademark Law Firm, PC; John F. Buckert

(57) ABSTRACT

A battery module and methods for bonding cell terminals of battery cells together are provided. The battery module includes a first battery cell having a first cell terminal, and a second battery cell having a second cell terminal. The battery module further includes an exothermal reactive layer having first and second sides. The first and second sides are disposed adjacent to the first and second cell terminals, respectively. The exothermal reactive layer is configured to ignite to form a bonding joint between the first and second cell terminals in response to a laser beam contacting at least a portion of the exothermal reactive layer.

9 Claims, 11 Drawing Sheets

(56) References Cited

U.S. PATENT DOCUMENTS

| | | | |
|---|---|---|---|
| 4,767,492 A | 8/1988 | Fukusima et al. | |
| 5,071,652 A | 12/1991 | Jones et al. | |
| 5,158,842 A * | 10/1992 | McHenry | 429/161 |
| 5,270,131 A | 12/1993 | Diethelm et al. | |
| 5,346,786 A | 9/1994 | Hodgetts | |
| 5,354,630 A | 10/1994 | Earl et al. | |
| 5,357,423 A | 10/1994 | Weaver et al. | |
| 5,364,711 A | 11/1994 | Yamada et al. | |
| 5,371,337 A * | 12/1994 | Campbell et al. | 219/121.63 |
| 5,385,793 A | 1/1995 | Tiedemann et al. | |
| 5,487,955 A | 1/1996 | Korall et al. | |
| 5,487,958 A | 1/1996 | Tura | |
| 5,510,203 A | 4/1996 | Hamada et al. | |
| 5,520,976 A | 5/1996 | Giannetti et al. | |
| 5,561,005 A | 10/1996 | Omaru et al. | |
| 5,589,290 A | 12/1996 | Klink et al. | |
| 5,603,444 A | 2/1997 | Sato | |
| 5,606,242 A | 2/1997 | Hull et al. | |
| 5,652,502 A | 7/1997 | van Phuc et al. | |
| 5,658,682 A | 8/1997 | Usuda et al. | |
| 5,663,007 A | 9/1997 | Ikoma et al. | |
| 5,693,432 A | 12/1997 | Matsumoto | |
| 5,756,227 A | 5/1998 | Suzuki et al. | |
| 5,796,239 A | 8/1998 | van Phuoc et al. | |
| 5,825,155 A | 10/1998 | Ito et al. | |
| 5,871,861 A * | 2/1999 | Hirokou et al. | 429/149 |
| 5,873,826 A | 2/1999 | Gono et al. | |
| 5,919,539 A | 7/1999 | Bisbis et al. | |
| 5,982,403 A | 11/1999 | Inagaki | |
| 6,016,047 A | 1/2000 | Notten et al. | |
| 6,027,831 A * | 2/2000 | Inoue et al. | 429/181 |
| 6,099,986 A | 8/2000 | Gauthier et al. | |
| 6,117,584 A | 9/2000 | Hoffman et al. | |
| 6,121,752 A | 9/2000 | Kitahara et al. | |
| 6,150,753 A | 11/2000 | Decastro | |
| 6,257,328 B1 | 7/2001 | Fujiwara et al. | |
| 6,353,815 B1 | 3/2002 | Vilim et al. | |
| 6,362,598 B2 | 3/2002 | Laig-Horstebrock et al. | |
| 6,406,812 B1 | 6/2002 | Dreulle et al. | |
| 6,413,678 B1 | 7/2002 | Hamamoto et al. | |
| 6,422,027 B1 | 7/2002 | Coates, Jr. et al. | |
| 6,441,586 B1 | 8/2002 | Tate, Jr. et al. | |
| 6,448,741 B1 | 9/2002 | Inui et al. | |
| 6,462,949 B1 | 10/2002 | Parish, IV et al. | |
| 6,475,659 B1 | 11/2002 | Heimer | |
| 6,515,454 B2 | 2/2003 | Schoch | |
| 6,534,954 B1 | 3/2003 | Plett | |
| 6,563,318 B2 | 5/2003 | Kawakami et al. | |
| 6,709,783 B2 | 3/2004 | Ogata et al. | |
| 6,724,172 B2 | 4/2004 | Koo | |
| 6,736,942 B2 * | 5/2004 | Weihs et al. | 204/192.12 |
| 6,771,502 B2 | 8/2004 | Getz, Jr. et al. | |
| 6,780,538 B2 | 8/2004 | Hamada et al. | |
| 6,821,367 B1 | 11/2004 | Macdonald et al. | |
| 6,821,671 B2 | 11/2004 | Hinton et al. | |
| 6,829,562 B2 | 12/2004 | Sarfert | |
| 6,832,171 B2 | 12/2004 | Barsoukov et al. | |
| 6,876,175 B2 | 4/2005 | Schoch | |
| 6,886,249 B2 | 5/2005 | Smalc | |
| 6,892,148 B2 | 5/2005 | Barsoukov et al. | |
| 6,927,554 B2 | 8/2005 | Tate, Jr. et al. | |
| 6,943,528 B2 | 9/2005 | Schoch | |
| 6,967,466 B2 | 11/2005 | Koch | |
| 6,982,131 B1 | 1/2006 | Hamada et al. | |
| 7,012,434 B2 | 3/2006 | Koch | |
| 7,026,073 B2 | 4/2006 | Ueda et al. | |
| 7,039,534 B1 | 5/2006 | Ryno et al. | |
| 7,061,246 B2 | 6/2006 | Dougherty et al. | |
| 7,072,871 B1 | 7/2006 | Tinnemeyer | |
| 7,098,665 B2 | 8/2006 | Laig-Hoerstebrock | |
| 7,109,685 B2 | 9/2006 | Tate, Jr. et al. | |
| 7,126,312 B2 | 10/2006 | Moore | |
| 7,147,045 B2 | 12/2006 | Quisenberry et al. | |
| 7,197,487 B2 | 3/2007 | Hansen et al. | |
| 7,199,557 B2 | 4/2007 | Anbuky et al. | |
| 7,229,327 B2 | 6/2007 | Zhao et al. | |
| 7,250,741 B2 | 7/2007 | Koo et al. | |
| 7,251,889 B2 | 8/2007 | Kroliczek et al. | |
| 7,253,587 B2 | 8/2007 | Meissner | |
| 7,264,902 B2 | 9/2007 | Horie et al. | |
| 7,315,789 B2 | 1/2008 | Plett | |
| 7,321,220 B2 | 1/2008 | Plett | |
| 7,327,147 B2 | 2/2008 | Koch | |
| 7,400,115 B2 | 7/2008 | Plett | |
| 7,446,504 B2 | 11/2008 | Plett | |
| 7,479,758 B2 | 1/2009 | Moon | |
| 7,518,339 B2 | 4/2009 | Schoch | |
| 7,521,895 B2 | 4/2009 | Plett | |
| 7,525,285 B2 | 4/2009 | Plett | |
| 7,583,059 B2 | 9/2009 | Cho | |
| 7,589,532 B2 | 9/2009 | Plett | |
| 7,600,664 B2 | 10/2009 | Dieterle et al. | |
| 7,828,190 B2 | 11/2010 | Saito et al. | |
| 8,088,516 B2 * | 1/2012 | Baker et al. | 429/242 |
| 8,177,878 B2 * | 5/2012 | Heinrich et al. | 75/252 |
| 8,403,019 B2 | 3/2013 | Khakhalev | |
| 8,517,078 B1 | 8/2013 | Johnston et al. | |
| 8,563,159 B2 * | 10/2013 | Meehan | 429/158 |
| 2001/0046624 A1 | 11/2001 | Goto et al. | |
| 2002/0031603 A1 | 3/2002 | Miyamoto et al. | |
| 2003/0082440 A1 | 5/2003 | Mrotek et al. | |
| 2003/0184307 A1 | 10/2003 | Kozlowski et al. | |
| 2004/0021442 A1 | 2/2004 | Higashino | |
| 2004/0023108 A1 | 2/2004 | Nakanishi et al. | |
| 2004/0247931 A1 | 12/2004 | Weihs et al. | |
| 2005/0026014 A1 | 2/2005 | Fogaing et al. | |
| 2005/0100786 A1 | 5/2005 | Ryu et al. | |
| 2005/0127874 A1 | 6/2005 | Lim et al. | |
| 2005/0134038 A1 | 6/2005 | Walsh | |
| 2005/0202311 A1 | 9/2005 | Higashino et al. | |
| 2006/0100833 A1 | 5/2006 | Plett | |
| 2006/0174994 A1 | 8/2006 | White | |
| 2006/0225842 A1 | 10/2006 | Darcy et al. | |
| 2007/0037051 A1 | 2/2007 | Kim et al. | |
| 2007/0087266 A1 | 4/2007 | Bourke et al. | |
| 2007/0120533 A1 | 5/2007 | Plett | |
| 2007/0126396 A1 | 6/2007 | Yang | |
| 2007/0257087 A1 | 11/2007 | Klinstein et al. | |
| 2008/0094035 A1 | 4/2008 | Plett | |
| 2008/0131700 A1 | 6/2008 | Duckham et al. | |
| 2009/0029239 A1 | 1/2009 | Koetting et al. | |
| 2009/0098416 A1 | 4/2009 | Hatta et al. | |
| 2009/0111015 A1 * | 4/2009 | Wood et al. | 429/164 |
| 2009/0186265 A1 | 7/2009 | Koetting et al. | |
| 2009/0255979 A1 | 10/2009 | Saito et al. | |
| 2009/0297892 A1 * | 12/2009 | Ijaz et al. | 429/7 |
| 2009/0297942 A1 * | 12/2009 | Jang et al. | 429/178 |
| 2009/0311607 A1 | 12/2009 | Han et al. | |
| 2009/0325051 A1 | 12/2009 | Niedzwiecki et al. | |
| 2009/0325052 A1 | 12/2009 | Koetting et al. | |
| 2009/0325053 A1 | 12/2009 | Koetting et al. | |
| 2009/0325054 A1 | 12/2009 | Payne et al. | |
| 2009/0325055 A1 | 12/2009 | Koetting et al. | |
| 2009/0325059 A1 | 12/2009 | Niedzwiecki et al. | |
| 2010/0038409 A1 * | 2/2010 | Wilden et al. | 228/121 |
| 2010/0086842 A1 | 4/2010 | Yang | |
| 2010/0190055 A1 | 7/2010 | Khakhalev | |
| 2010/0276086 A1 | 11/2010 | Oblak et al. | |
| 2010/0281681 A1 | 11/2010 | Rourke et al. | |
| 2011/0108181 A1 | 5/2011 | Cai et al. | |
| 2011/0114705 A1 * | 5/2011 | Matis | 228/121 |
| 2011/0117420 A1 * | 5/2011 | Kim et al. | 429/158 |
| 2011/0229745 A1 * | 9/2011 | Barter et al. | 429/90 |
| 2011/0284169 A1 | 11/2011 | Khakhalev | |
| 2011/0287300 A1 * | 11/2011 | Byun et al. | 429/158 |
| 2011/0293992 A1 * | 12/2011 | Hsu et al. | 429/152 |
| 2011/0300438 A1 | 12/2011 | Khakhalev | |
| 2011/0308736 A1 | 12/2011 | Scheuerman et al. | |
| 2012/0111924 A1 * | 5/2012 | Makita et al. | 228/121 |
| 2012/0153006 A1 | 6/2012 | Koetting et al. | |
| 2012/0158168 A1 | 6/2012 | Khakhalev | |
| 2012/0180929 A1 | 7/2012 | Koetting et al. | |
| 2013/0042959 A1 | 2/2013 | Khakhalev et al. | |
| 2013/0048698 A1 | 2/2013 | Khakhalev | |

(56) References Cited

U.S. PATENT DOCUMENTS

FOREIGN PATENT DOCUMENTS

| | | | |
|---|---|---|---|
| EP | 0673553 B1 | 2/2001 |
| EP | 1435675 A1 | 7/2004 |
| EP | 2579356 A2 | 4/2013 |
| JP | 4056079 A | 2/1992 |
| JP | 6114658 A | 4/1994 |
| JP | 7009169 A | 1/1995 |
| JP | 8138735 A | 5/1996 |
| JP | 8222280 A | 8/1996 |
| JP | 9129213 A | 5/1997 |
| JP | 09-219213 | 8/1997 |
| JP | 10199510 A | 7/1998 |
| JP | 11066949 A | 3/1999 |
| JP | 11191432 A | 7/1999 |
| JP | 2003165161 A | 6/2003 |
| JP | 2003219572 A | 7/2003 |
| JP | 2005503265 A | 2/2005 |
| JP | 2005-126315 | 5/2005 |
| JP | 2006212692 A | 8/2006 |
| JP | 2008-080995 | 4/2008 |
| JP | 2008183622 A | 8/2008 |
| JP | 2009090364 A | 4/2009 |
| KR | 20050121116 A | 12/2005 |
| KR | 20070060161 A | 6/2007 |
| KR | 100765659 B1 | 10/2007 |
| KR | 20070104904 A | 10/2007 |
| KR | 20070109929 A | 11/2007 |
| KR | 20080047641 A | 5/2008 |
| KR | 20080077424 A | 8/2008 |
| KR | 100889241 B1 | 3/2009 |
| KR | 100921346 B1 | 10/2009 |
| KR | 102010099652 | 9/2010 |
| WO | 9701432 A | 1/1997 |
| WO | WO03/071616 A2 | 8/2003 |
| WO | 2006090511 A1 | 8/2006 |

OTHER PUBLICATIONS

European Supplementary Search Report dated Aug. 28, 2009 for EP Application No. 04774658.
International Search Report for International application No. PCT/KR2005/003755 dated Mar. 2, 2006.
International Search Report for PCT/KR2009/000258 dated Aug. 28, 2009.
International Search report for PCT/KR2009/003434 dated Jan. 18, 2010.
Machine translation of JP 08-138735.
Machine translation of JP 10-199510.
Machine translation of JP 2000 260469.
U.S. Appl. No. 12/433,427, filed Apr. 30, 2009 entitled Cooling Manifold and Method for Manufacturing the Cooling Manifold.
U.S. Appl. No. 12/794,949, filed Jun. 7, 2010 entitled Battery Module and Methods for Bonding a Cell Terminal of a Battery to an Interconnect Member.
U.S. Appl. No. 12/857,908, filed Aug. 17, 2010 entitled Battery Cell Assemblies.
U.S. Appl. No. 12/861,364, filed Aug. 23, 2010 entitled Connecting Assembly.
U.S. Appl. No. 12/861,375, filed Aug. 23, 2010 entitled attery System and Manifold Assembly Having a Manifold Member and a Connecting Fitting.
U.S. Appl. No. 12/861,381, filed Aug. 23, 2010 entitled End Cap.
U.S. Appl. No. 12/861,394, filed Aug. 23, 2010 entitled Battery System and Manifold Assembly With Two Manifold Members Removably Coupled Together.
International Search Report for International Application No. PCT/KR2011/003497 dated Jan. 9, 2012.
U.S. Appl. No. 13/213,416, filed Aug. 9, 2011 entitled "Ultrasonic Welding Machine and Method of Aligning an Ultrasonic Welding Horn Relative to an Anvil".
U.S. Appl. No. 13/556,411, filed Jul. 24, 2012 entitled "Ultrasonic Welding Assembly and Method of Attaching an Anvil to a Bracket of the Assembly".
Machine translation of JP 10-199510, Dec. 18, 2008.
Machine translation of JP 2000 260469, Aug. 10, 2009.
U.S. Appl. No. 12/426,795, filed Apr. 20, 2009 entitled Frame Member, Frame Assembly and Battery Cell Assembly Made Therefrom and Methods of Making the Same.
U.S. Appl. No. 12/433,155, filed Apr. 30, 2009 entitled Cooling System for a Battery System and a Method for Cooling the Battery System.
U.S. Appl. No. 12/433,397, filed Apr. 30, 2009 entitled Battery Systems, Battery Modules, and Method for Cooling a Battery Module.
U.S. Appl. No. 12/433,427, filed Apr. 30 ,2009 entitled Cooling Manifold and Method for Manufacturing the Cooling Manifold.
U.S. Appl. No. 12/433,485, filed Apr. 30, 2009 entitled Battery Systems, Battery Module, and Method for Cooling the Battery Module.
U.S. Appl. No. 12/433,534, filed Apr. 30, 2009 entitled Battery Systems, Battery Modules, and Method for Cooling a Battery Module.
U.S. Appl. No. 12/511,530, filed Jul. 29, 2009 entitled Battery Module and Method for Cooling the Battery Module.
U.S. Appl. No. 12/511,552, filed Jul. 29, 2009 entitled Battery Module and Method for Cooling the Battery Module.
U.S. Appl. No. 12/549,766, filed Aug. 28, 2009 entitled Battery Module and Method for Cooling the Battery Module.
International Search Report for International Application No. PCT/KR2012/006222 dated Feb. 1, 2013.

* cited by examiner

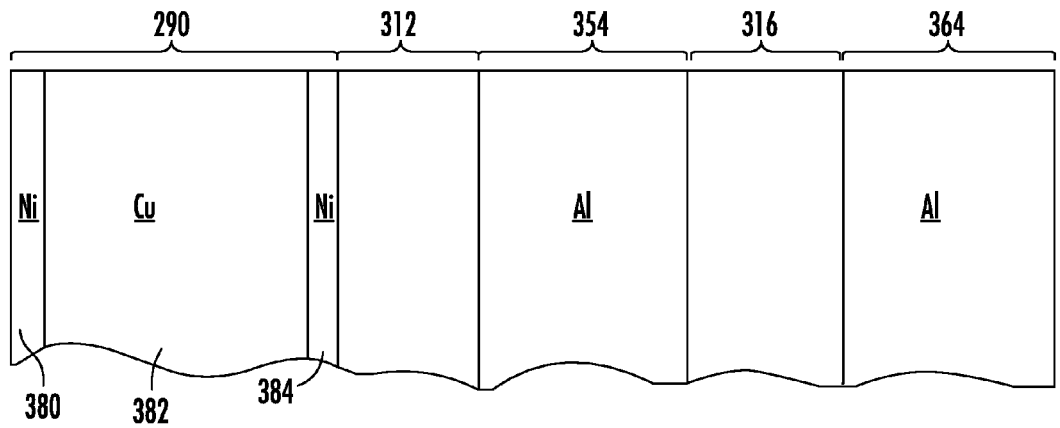
*FIG. 8*
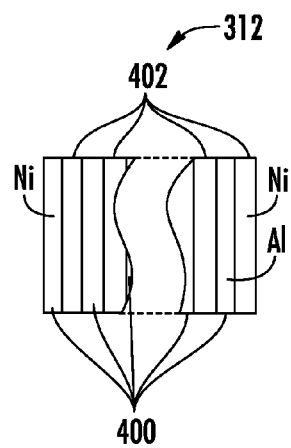 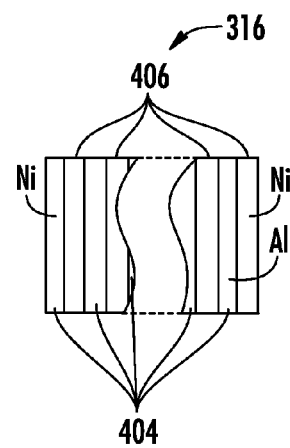
*FIG. 9*  *FIG. 10*

BATTERY MODULE AND METHODS FOR BONDING CELL TERMINALS OF BATTERY CELLS TOGETHER

BACKGROUND

Battery modules have battery cells with cell terminals that are welded together. Further, ultrasonic welding devices have a relatively long cycle time for welding the cell terminals together. Further, a welding tool of an ultrasonic welding device must be sequentially moved to each group of cell terminals that takes a relatively large amount of manufacturing time. Further, the welding tool must be allowed to cool between each weld that takes an additional amount of manufacturing time.

Accordingly, the inventors herein have recognized a need for an improved battery module and methods for bonding cell terminals of the battery module together.

SUMMARY

A battery module in accordance with an exemplary embodiment is provided. The battery module includes a first battery cell having a first cell terminal. The battery module further includes a second battery cell having a second cell terminal The battery module further includes an exothermal reactive layer having first and second sides. The first side is disposed adjacent to the first cell terminal. The second side is disposed adjacent to the second cell terminal. The exothermal reactive layer is configured to ignite to form a bonding joint between the first and second cell terminals in response to a laser beam contacting at least a portion of the exothermal reactive layer.

A method for bonding first and second cell terminals of first and second battery cells, respectively, together, in accordance with another exemplary embodiment is provided. The method includes disposing an exothermal reactive layer between the first and second cell terminals, utilizing a component placement machine. The method further includes emitting a laser beam from a laser for a predetermined amount of time that contacts at least a portion of the exothermal reactive layer and ignites the exothermal reactive layer to form a bonding joint between the first and second cell terminals.

A method for bonding first and second cell terminals of first and second battery cells, respectively, together, in accordance with another exemplary embodiment is provided. The method includes disposing the first cell terminal adjacent to the second cell terminal having an exothermal reactive layer previously disposed thereon, utilizing a component placement machine. The method further includes emitting a laser beam from a laser for a predetermined amount of time that contacts at least a portion of the exothermal reactive layer and ignites the exothermal reactive layer to form a bonding joint between the first and second cell terminals.

These and other advantages and features will become more apparent from the following description taken in conjunction with the drawings.

BRIEF DESCRIPTION OF THE DRAWINGS

FIG. 8 is a simplified enlarged cross-sectional schematic of a portion of an interconnect member, a first exothermal reactive layer, a first cell terminal, a second exothermal reactive layer, and a second cell terminal in accordance with another exemplary embodiment;

FIG. 9 is a simplified enlarged cross-sectional schematic of a portion of the first exothermal reactive layer of FIG. 8;

FIG. 10 is a simplified enlarged cross-sectional schematic of a portion of the second exothermal reactive layer of FIG. 8;

FIG. 11 is a block diagram of a system utilized to ignite exothermal reactive layers;

DETAILED DESCRIPTION

Figure 1:
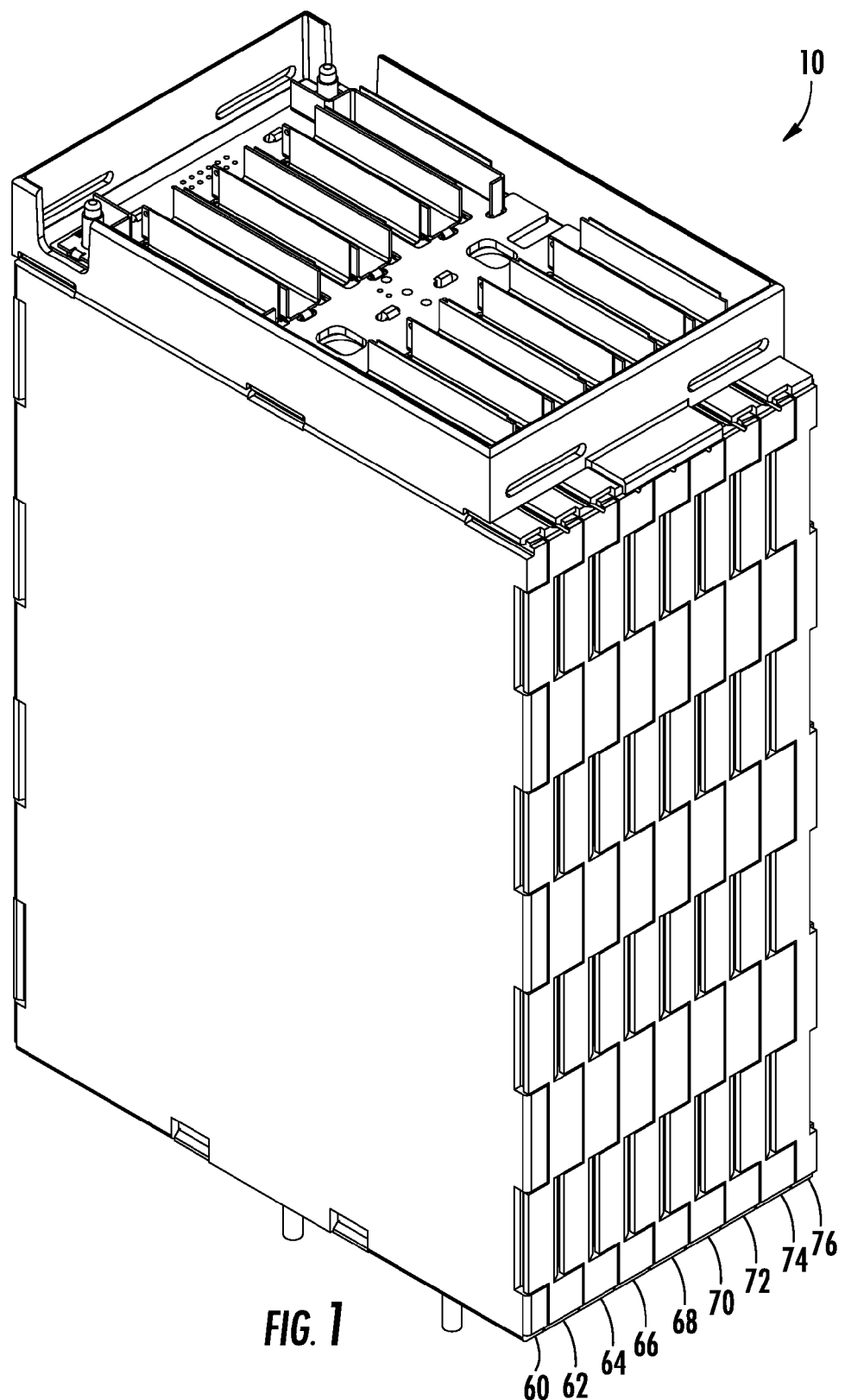
FIG. 1 is a schematic of a battery module in accordance with an exemplary embodiment.
Figure 2:
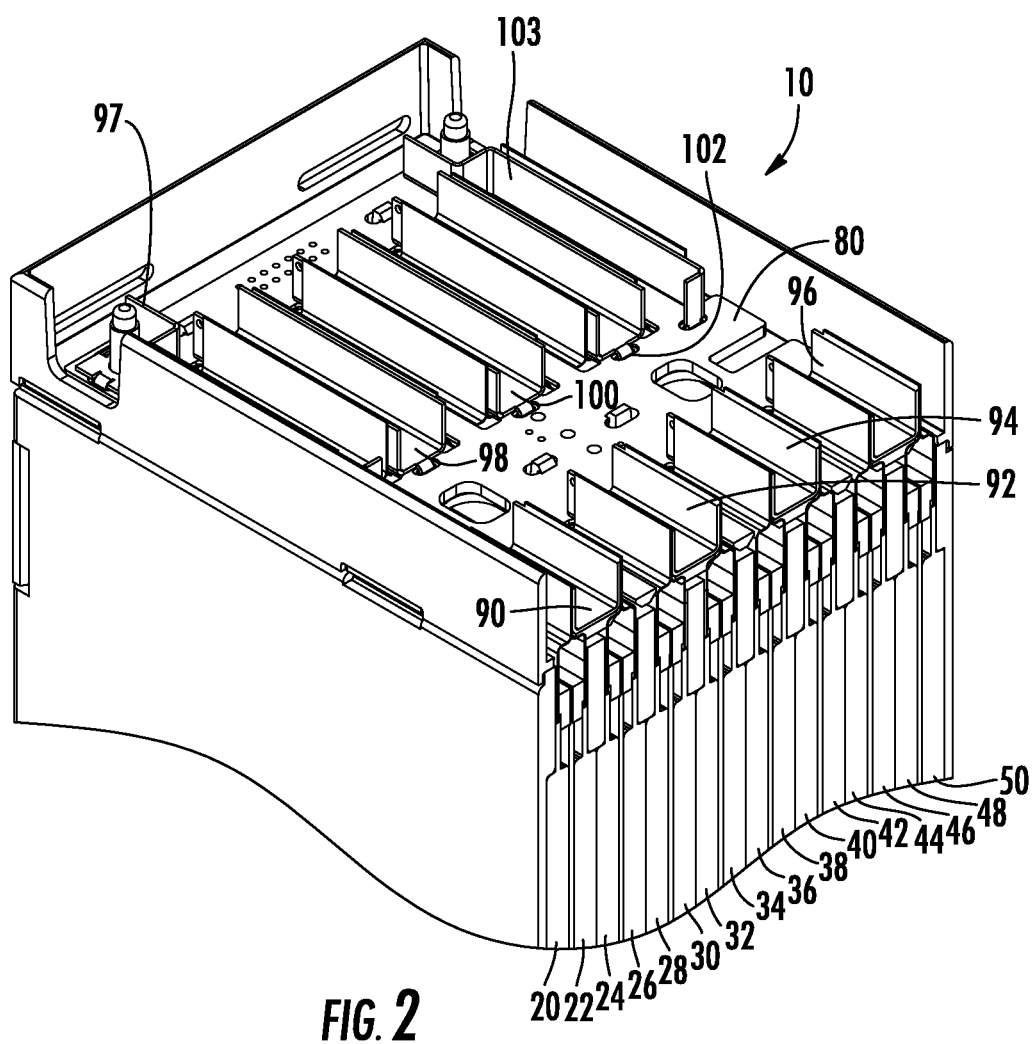
FIG. 2 is a cross-sectional schematic of a top portion of the battery module of FIG. 1.
Figure 4:
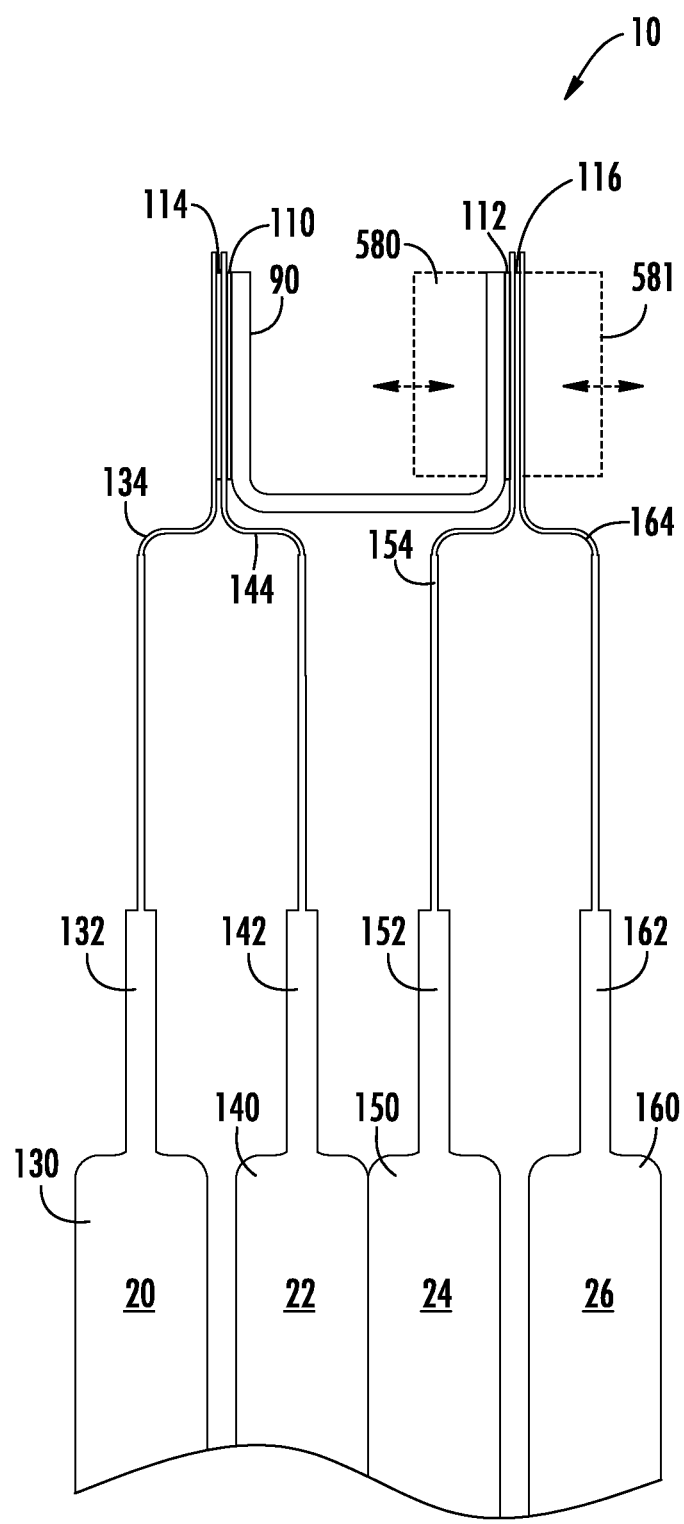
FIG. 4 is a cross-sectional schematic of the four battery cells and the interconnect member of FIG. 3.

Referring to the FIG. 1, a schematic of a battery module 10 that is configured to provide electrical power to a battery-electric vehicle or a hybrid vehicle in accordance with an exemplary embodiment is illustrated. Referring to FIGS. 1, 2, and 4, the battery module 10 includes battery cells 20, 22, 24, 26, 28, 30, 32, 34, 36, 38, 40, 42, 44, 46, 47, 48, 50, frame members 60, 62, 64, 66, 68, 70, 72, 74, 76, a circuit board 80, interconnect members 90, 92, 94, 96, 97, 98, 100, 102, 103 and exothermal reactive layers including exothermal reactive layers 110, 112, 114, 116. An advantage of the battery module 10 is that the module 10 utilizes exothermal reactive layers that can be ignited utilizing a laser beam during manufacture of the module 10 to bond cell terminals of the battery cells together and to bond the cell terminals to associated interconnect members extremely quickly. An exothermal reactive layer refers to a layer that generates heat after being ignited.

Figure 3:
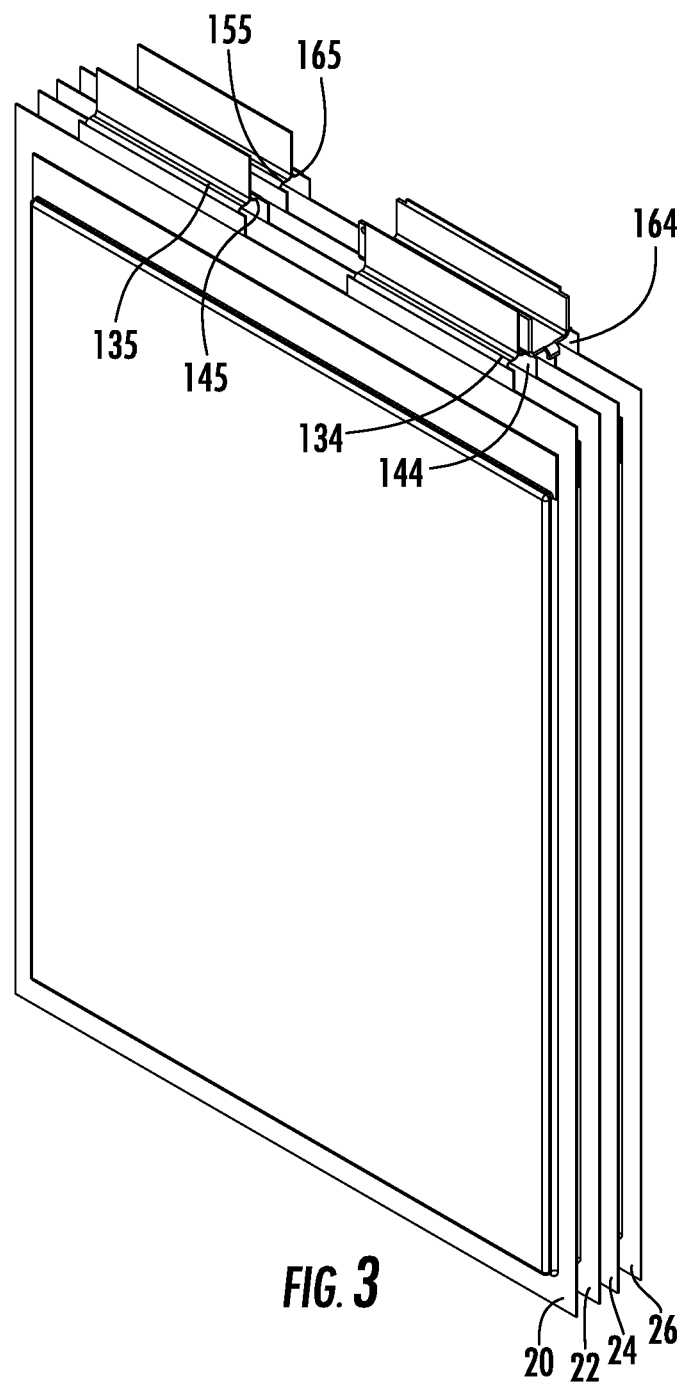
FIG. 3 is a schematic of four battery cells and an interconnect member utilized in the battery module of FIG. 1.

Referring to FIGS. 2, 3 and 4, in the illustrated exemplary embodiment, the battery cells 20-50 are lithium-ion battery cells. Further, the structure of the battery cells 20-50 are substantially similar to one another. Of course, in alternative embodiments, the battery cells could be other types of battery cells known to those skilled in the art.

The battery cell 20 includes a body portion 130, an extension portion 132 extending around a periphery of the body portion 130, and cell terminals 134, 135 extending outwardly from the extension portion 132. In one exemplary embodiment, the cell terminal 134 is a nickel-plated copper cell terminal and the cell terminal 135 is an aluminum cell terminal.

Further, the battery cell 22 includes a body portion 140, an extension portion 142 extending around a periphery of the body portion 140, and cell terminals 144, 145 extending outwardly from the extension portion 142. In one exemplary embodiment, the cell terminal 144 is a nickel-plated copper cell terminal and the cell terminal 145 is an aluminum cell terminal.

Also, the battery cell 24 includes a body portion 150, an extension portion 152 extending around a periphery of the body portion 150, and cell terminals 154, 155 extending outwardly from the extension portion 152. In particular, the extension portion 152 extends from the body portion 150 in a first direction, The cell terminal 154 extends from the extension portion 152 in the first direction, The cell terminal 154 has a first cell terminal portion extending in the first direction. The first cell terminal portion has a first flat side. The first cell terminal portion further includes a first end disposed a distance from the extension portion 152. In one exemplary embodiment, the cell terminal 154 is a nickel-plated copper cell terminal and the cell terminal 155 is an aluminum cell terminal.

Further, the battery cell 26 includes a body portion 160, an extension portion 162 extending around a periphery of the body portion 160, and cell terminals 164, 165 extending outwardly from the extension portion 162. In particular, the extension portion 162 extends from the body portion 160 in the first direction. The cell terminal 164 extends from the extension portion 162 in the first direction. The cell terminal 164 has a second cell terminal portion extending in the first direction. The second cell terminal portion has a second flat side. The second cell terminal portion further includes a second end disposed a distance from the extension portion 162. In one exemplary embodiment, the cell terminal 164 is a nickel-plated copper cell terminal and the cell terminal 165 is an aluminum cell terminal.

The frame members 60, 62, 64, 66, 68, 70, 72, 74, 76 are configured to be coupled together to enclose the battery cells 20-50 therebetween, and the frame members 60, 62 are configured to be coupled together and to hold the battery cells 20, 22 therebetween. Further, the frame members 62, 64 are configured to be coupled together and to hold the battery cells 24, 26 therebetween, and the frame members 64, 66 are configured to be coupled together and to hold battery cells 28, 30 therebetween. Also, the frame members 66, 68 are configured to be coupled together and to hold battery cells 32, 34 therebetween, and the frame members 68, 70 are configured to be coupled together and to hold battery cells 36, 38 therebetween. In addition, the frame members 70, 72 are configured to be coupled together and to hold battery cells 40, 42 therebetween, and the frame members 72, 74 are configured to be coupled together and to hold battery cells 44, 46 therebetween. Finally, the frame members 74, 76 are configured to be coupled together and to hold battery cells 48, 50 therebetween.

Figure 5:
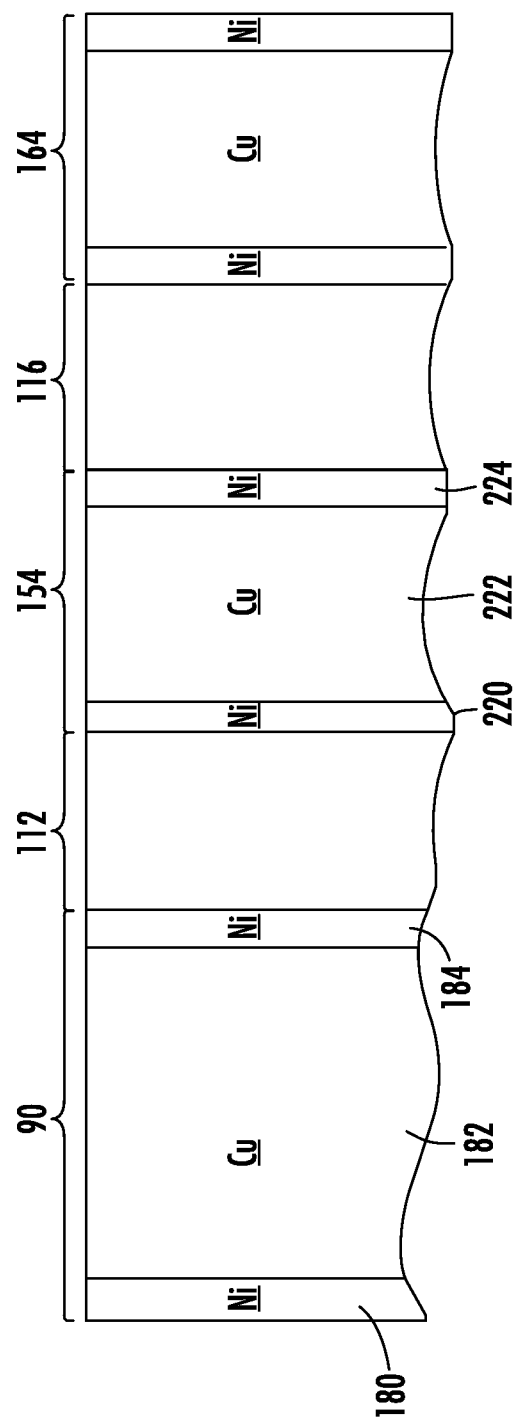
FIG. 5 is a simplified enlarged cross-sectional schematic of a portion of an interconnect member, a first exothermal reactive layer, a first cell terminal, a second exothermal reactive layer, and a second cell terminal in accordance with another exemplary embodiment.

Referring to FIGS. 2, 4 and 5, the interconnect members 90, 92, 94, 96, 97, 98, 100, 102, 103 are provided to electrically couple cell terminals of the battery cells 20-50 in series with one another. Since the interconnect members 90, 92, 94, 96, 98, 100, 102 have a substantially similar configuration, only the structure of interconnect member 90 will be discussed in detail. The interconnect member 90 is substantially U-shaped and has outer nickel layers 180, 184 and a central copper layer 182. As illustrated, a surface of the nickel layer 184 is disposed adjacent to a first side of the exothermal reactive layer 112 also having a nickel layer. In an alternative embodiment, the surface of the nickel layer 184 is disposed adjacent to a first side of the exothermal reactive layer 112 having an aluminum layer. In one exemplary embodiment, a wall of the interconnect member 90 has a thickness in a range of 0.5-1.0 millimeters. As shown in FIG. 2, the interconnect members 97 and 103 have a different shape than the other interconnect members, and the interconnect members 97 and 103 are constructed of the same materials as the other interconnect members.

Figure 6:
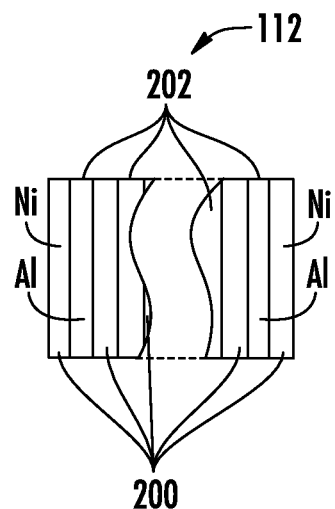
FIG. 6 is a simplified enlarged cross-sectional schematic of a portion of the first exothermal reactive layer of FIG. 5.
Figure 14:
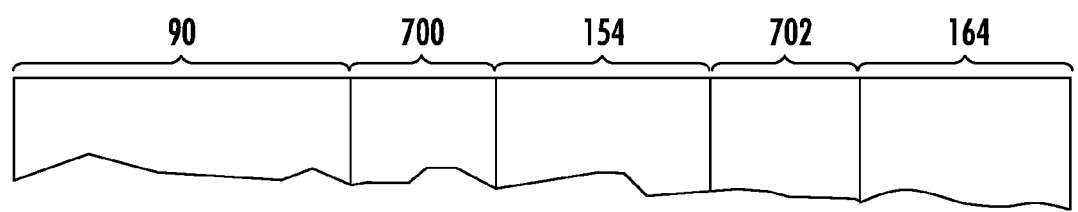
FIG. 14 is a simplified enlarged cross-sectional schematic a portion of an interconnect member, a first bonding joint, a first cell terminal, a second bonding joint, and a second cell terminal in accordance with another exemplary embodiment.

Referring to FIGS. 5, 6, and 14, the exothermal reactive layer 112 is provided to ignite in response to a laser beam contacting the exothermal reactive layer 112 in order to form a bonding joint 700 between the interconnect member 90 and the cell terminal 154. In the illustrated embodiment, the exothermal reactive layer 112 is constructed of a plurality of nickel layers 200 and a plurality of aluminum layers 202. Each nickel layer 200 has an adjacent aluminum layer 202 disposed thereon. The layers 200 and 202 are extremely thin and are deposited on each other utilizing a vapor deposition process or a magnetron sputtering process for example. Further, a total thickness of the exothermal reactive layer 112 is in a range of 40-200 microns. The exothermal reactive layer 112 has a first side disposed adjacent to a wall of the interconnect member 90 and a second side disposed adjacent to the cell terminal 154. Also, in one exemplary embodiment, the exothermal reactive layer 112 comprises a product named "NanoFoil" manufactured by Indium Corporation of America and is a separate component. In another alternative embodiment, the layer 112 is formed on a portion of the outer wall of the interconnect member 90 during manufacture of the interconnect member 90. In still another alternative embodiment, the layer 112 is formed on a portion of the cell terminal 154 during manufacture of the battery cell 24. The exothermal reactive layer 112 is configured to ignite in response to a laser beam contacting the layer 112 with a power density of $0.1 \times 10^8$ Watts/cm$^2$ to $5.0 \times 10^8$ Watts/cm$^2$. When ignited, the exothermal reactive layer 112 may burn at a temperature level of at least 1200 degrees Celsius to form a bonding joint 710 (e.g., a weld joint) between the interconnect member 90 and the cell terminal 154.

Figure 7:
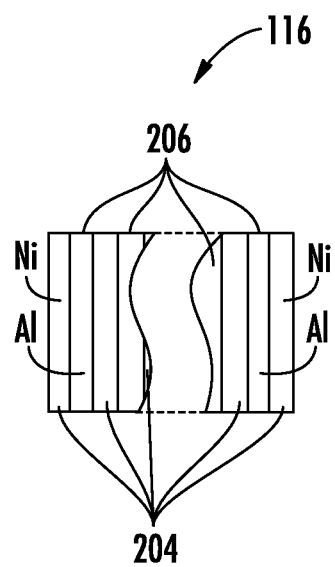
FIG. 7 is a simplified enlarged cross-sectional schematic of a portion of the second exothermal reactive layer of FIG. 5.
Figure 17:
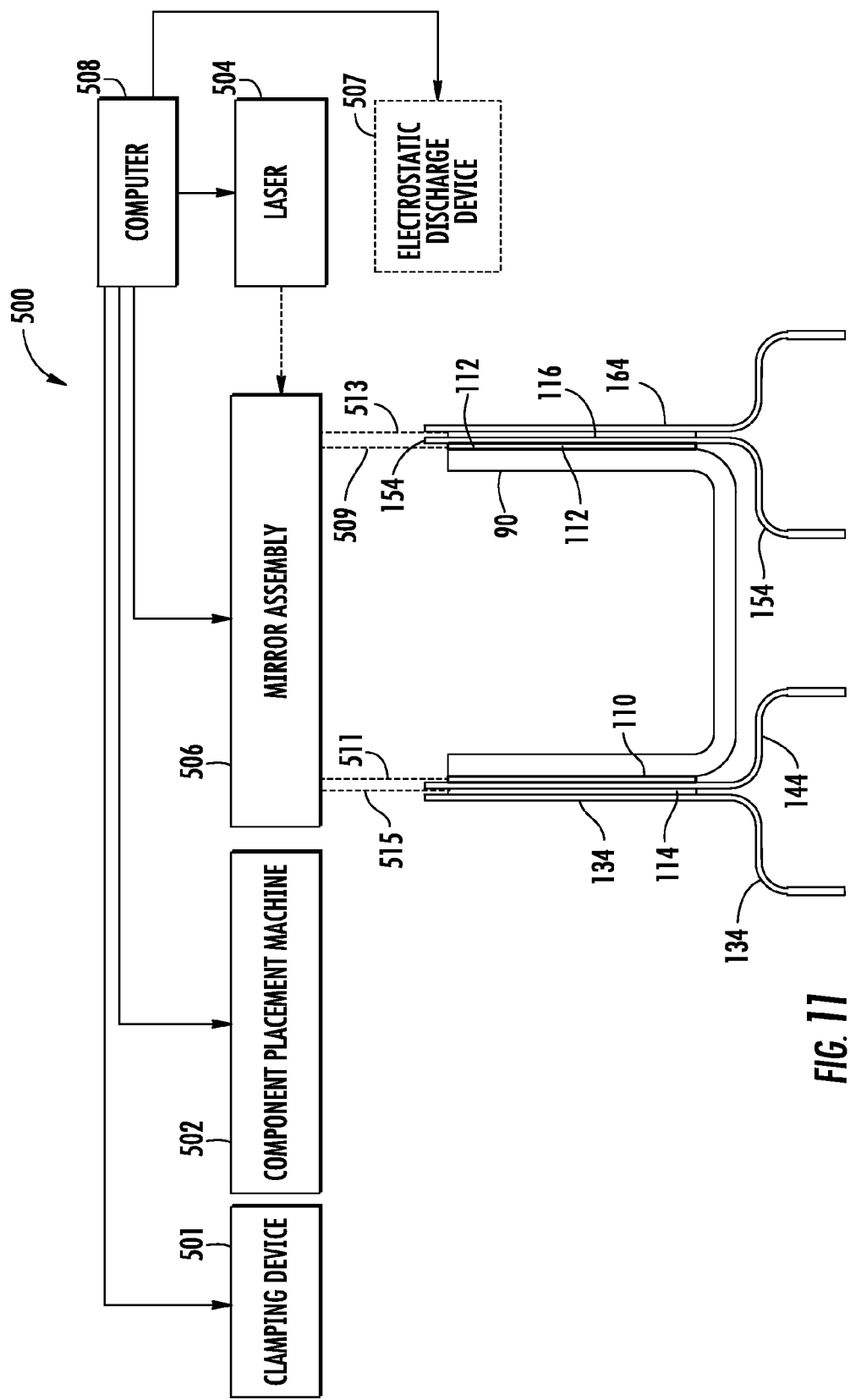

Referring to FIGS. 5, 7, and 14, the exothermal reactive layer 116 is provided to ignite in response to a laser beam contacting the exothermal reactive layer 116 in order to form a bonding joint 702 between the cell terminals 154, 164. In the illustrated embodiment, the exothermal reactive layer 116 is constructed of a plurality of nickel layers 204 and a plurality of aluminum layers 206. Each nickel layer 204 has an adjacent aluminum layer 206 disposed thereon. The layers 204 and 206 are extremely thin and are deposited on each other utilizing a vapor deposition process or a magnetron sputtering process for example. Further, a total thickness of the exothermal reactive layer 116 is in a range of 40-200 microns. The exothermal reactive layer 116 has a first side disposed adjacent to the cell terminal 154 and a second side disposed adjacent to the cell terminal 164. In particular, the exothermal reactive layer 116 is disposed. between the first and second flat sides of the first and second cell terminal portions, respectively, of the cell terminals 154, 156 and contact the first and second flat sides. A top end of the exothermal reactive layer 116 is disposed a first distance from the first and second ends of the first and second cell terminal portions, respectively, of the cell terminals 154, 156, respectively, in the first direction. The first distance is greater than a thickness of the exothermal reactive layer 116 in a second direction substantially perpendicular to the first direction. An open region is located between the first and second cell terminal portions of the cell terminals 154, 156 respectively and extend from the top end of the exothermal reactive layer 116 to the first and second ends of the first and second cell terminal portions, respectively, of the cell terminals 154, 156, respectively. The exothermal reactive layer 116 has first and second sides. The first side is disposed adjacent to the first cell terminal portion of the cell terminal 154, and the second side is disposed adjacent to the second cell terminal portion of the cell terminal 156. Also, in one exemplary embodiment, the exothermal reactive layer 116 comprises a product named "NanoFoil" manufactured by Indium Corporation of America and is a separate component. In another alternative embodiment, the layer 116 is formed on a portion of the cell terminal 154 or a portion of the cell terminal 164 during manufacture of the cell terminals prior to assembly of the battery module. The exothermal reactive layer 116 is configured to ignite in response to a laser beam contacting the layer 116 with a power density of $0.1\times 10^8$ Watts/cm$^2$ to $5.0\times 10^8$ Watts/cm$^2$. When ignited, the exothermal reactive layer 116 may burn at a temperature level of at least 1200 degrees Celsius to form a bonding joint 712 (e.g., a weld joint) between the cell terminal 154 and the cell terminal 164.

Referring to FIGS. 2 and 5, in the illustrated embodiment, the battery cells 20-50 have cell terminals with substantially similar structures. The cell terminal 154 of the battery cell 24 will be described in further detail below. In particular, the cell terminal 154 has outer nickel layers 220, 224 and a central copper layer 222 disposed between the layers 220, 224. In the illustrated embodiment, a thickness of the cell terminal 154 is 0.2 millimeters. Of course, in alternative embodiments, a thickness of the cell terminals 154 could be 0.1-0.2 millimeters for example. The nickel layer 220 is bonded (e.g., welded) to the exothermal reactive layer 112. In an alternative embodiment, a thin tin-alloy layer may be disposed between the cell terminal 154 and the exothermal reactive layer 112 to assist in bonding the cell terminal 154 to the interconnect layer 90. Further, a thin tin-alloy layer may be disposed between the interconnect member 90 and the exothermal reactive layer 112 to assist in bonding the cell terminal 154 to the interconnect layer 90. Further, a thin tin-alloy layer may be disposed between the cell terminal 154 and the exothermal reactive layer 116 to assist in bonding the cell terminal 154 to the exothermal reactive layer 116. Also, a thin tin-alloy layer may be disposed between the cell terminal 164 and the exothermal reactive layer 116 to assist in bonding the cell terminal 164 to the exothermal reactive layer 116.

Referring to FIG. 8, an alternative configuration for the interconnect member, a first exothermal reactive layer, a first cell terminal, a second exothermal reactive layers, and a second cell terminal will be discussed. In particular, an interconnect member 290, an exothermal reactive layer 312, a cell terminal 354, an exothermal reactive layer 316, and a cell terminal 364 will be discussed. The interconnect member 290 is substantially U-shaped and has outer nickel layers 380, 384 and a central copper layer 382. As illustrated, a surface of the nickel layer 384 is disposed adjacent to a first side of the exothermal reactive layer 312. In one exemplary embodiment, a wall of the interconnect member 290 has a thickness in a range of 0.5-1.0 millimeters.

Figure 15:
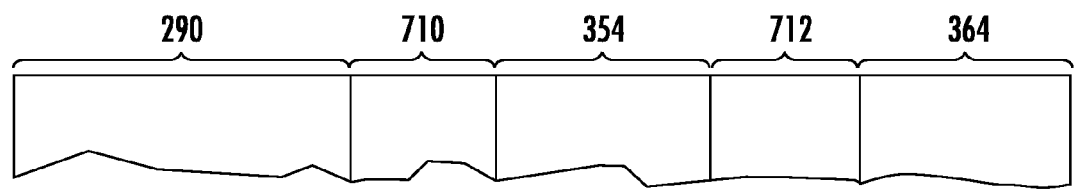
FIG. 15 is another simplified enlarged cross-sectional schematic a portion of an interconnect member, a first bonding joint, a first cell terminal, a second bonding joint, and a second cell terminal in accordance with another exemplary embodiment.

Referring to FIGS. 8, 9 and 15, the exothermal reactive layer 312 is provided to ignite in response to a laser beam contacting the exothermal reactive layer 312 in order to form the bonding joint 710 between the interconnect member 290 and the cell terminal 354. In the illustrated embodiment, the exothermal reactive layer 312 is constructed of a plurality of nickel layers 400 and a plurality of aluminum layers 402. Each nickel layer 400 has an adjacent aluminum layer 402 disposed of thereon. The layers 400 and 402 are extremely thin and are deposited on each other utilizing a vapor deposition process or a magnetron sputtering process. Further, a thickness of the exothermal reactive layer 312 is in a range of 40-200 microns. The exothermal reactive layer 312 has a first side disposed adjacent to a wall of the interconnect member 290 and a second side disposed adjacent to the cell terminal 354. Also, in one exemplary embodiment, the exothermal reactive layer 312 comprises a product named "NanoFoil" manufactured by Indium Corporation of America and is a separate component. In another alternative embodiment, the layer 312 is formed on a portion of the outer wall of the interconnect member 290 during manufacture of the interconnect member 290. In still another alternative embodiment, the layer 312 is formed on a portion of the cell terminal 354 during manufacture of an associated battery cell. The exothermal reactive layer 312 is configured to ignite in response a laser beam contacting the layer 312 with a power density of $0.1\times 10^8$ Watts/cm$^2$ to $5.0\times 10^8$ Watts/cm$^2$. When ignited, the exothermal reactive layer 312 may burn at a temperature level of at least 1200 degrees Celsius to form the bonding joint 710 (e.g., a weld joint) between the interconnect member 290 and the cell terminal 354.

The cell terminal 354 is constructed of aluminum and is bonded with an aluminum layer of the exothermal reactive layer 312. In the illustrated embodiment, a thickness of the cell terminal 354 is 0.2 millimeters. Of course, in an alternative embodiment, a thickness of the cell terminal 354 is 0.1-0.2 millimeters.

Referring to FIGS. 8, 10 and 15, the exothermal reactive layer 316 is provided to ignite in response to a laser beam contacting the exothermal reactive layer 316 in order to form the bonding joint 712 between the cell terminal 354 and the cell terminal 364. In the illustrated embodiment, the exothermal reactive layer 316 is constructed of a plurality of nickel layers 404 and a plurality of aluminum layers 406. Each nickel layer 404 has an adjacent aluminum layer 406 disposed of thereon. The layers 404 and 406 are extremely thin and are deposited on each other utilizing a vapor deposition process or a magnetron sputtering process. Further, a thickness of the exothermal reactive layer 316 is in a range of 40-200 microns. The exothermal reactive layer 316 has a first side disposed adjacent to the cell terminal 354 and a second side disposed adjacent to the cell terminal 364. Also, in one exemplary embodiment, the exothermal reactive layer 316 comprises a product named "NanoFoil" manufactured by Indium Corporation of America and is a separate component. In another alternative embodiment, the layer 316 is formed on a portion of either the cell terminal 354 or the cell terminal 364 during manufacture of the cell terminals. The exothermal reactive layer 316 is configured to ignite in response a laser beam contacting the layer 316 with a power density of $0.1\times 10^8$ Watts/cm$^2$ to $5.0\times 10^8$ Watts/cm$^2$. When ignited, the exothermal reactive layer 316 may burn at a temperature level of at least 1200 degrees Celsius to form the bonding joint 712 (e.g., a weld joint) between the cell terminal 354 and the cell terminal 364.

The cell terminal 364 is constructed of aluminum and is bonded with an aluminum layer of the exothermal reactive layer 316. In the illustrated embodiment, a thickness of the cell terminal 364 is 0.2 millimeters. Of course, in an alternative embodiment, a thickness of the cell terminal 364 is 0.1-0.2 millimeters.

Referring to FIGS. 5, 11, and 14, a system 500 for bonding the cell terminals of battery cells of the battery module 10 together, and for bonding interconnect members to the cell terminals, will now be described. Further, for purposes of simplicity, the system 500 will be explained utilizing the interconnect member 90, the exothermal reactive layer 112, the battery cell terminal 154, the exothermal reactive layer 116, and the battery cell terminal 164. However, it should be understood that the system 500 can be utilized to weld a plurality of other cell terminals together, and interconnect members to cell terminals in the battery module 10 or in other battery modules. The system 500 includes a clamping device 501, a component placement machine 502, a laser 504, a mirror assembly 506, an optional electrostatic discharge device 507, and a computer 508.

The clamping device 501 is configured to clamp the interconnect member 90, the exothermal reactive layer 112, the cell terminal 154, the exothermal reactive layer 116, and the battery cell terminal 164 together, in response to control signals from the computer 508. The clamping device 501 holds the interconnect member 90, the exothermal reactive layer 112, the cell terminal 154, the exothermal reactive layer 116, and the battery cell terminal 164 together when the exothermal reactive layers 112, 116 are ignited to form the bonding joints 702, 712, respectively. In one exemplary embodiment, the clamping device 501 has clamping members 580, 581 and an actuator that moves the members 580, 581 toward one another to apply a clamping force of 40-60 psi to the combination of the interconnect member 90, the exothermal reactive layer 112, the cell terminal 154, the exothermal reactive layer 116, and the battery cell terminal 164 disposed between the clamping members 580, 581, in response to a control signal from the computer 508. After the bonding joints 702, 712 are formed, the actuator moves the clamping members 580, 581 away from one another to release the combination of the interconnect member 90, the exothermal reactive layer 112, the cell terminal 154, the exothermal reactive layer 116, and the battery cell terminal 164, in response to another control signal from the computer 508.

In the illustrated embodiment, the component placement machine 502 is configured to dispose the exothermal reactive layer 112 between the interconnect member 90 and the cell terminal 154. In an alternative embodiment, the component placement machine 502 is configured to dispose an interconnect member having an exothermal reactive layer previously disposed thereon adjacent to a cell terminal of the battery cell. In still another alternative embodiment, the component placement machine 502 is configured to dispose an interconnect member adjacent to a cell terminal of a battery cell having an exothermal reactive layer previously disposed thereon. The component placement machine 502 is configured to dispose the exothermal reactive layer 116 between the cell terminals 112, 116. In an alternative embodiment, the component placement machine 502 is further configured to dispose the cell terminal 116 adjacent to a cell terminal having an exothermal layer that was previously disposed thereon. The component placement machine 502 is operably coupled to the computer 508 and performs tasks based on control signals received from the computer 508. In one exemplary embodiment, the component placement machine 502 is a robotic placement machine.

The laser 504 is configured to iteratively emit laser beams for predetermined amounts of time in response to control signals from the computer 508. In the illustrated embodiment, the laser 504 emits a laser beam toward the mirror assembly 506 for less than or equal to 0.1 milliseconds. In an alternative embodiment, the laser 504 can be a yttrium aluminum garnet (YAG) laser, a $CO_2$ laser, a fiber laser, or a disc laser for example.

The mirror assembly 506 is configured to receive laser beams from the laser 504 and to direct the laser beams toward portions of exothermal reactive layers. In particular, the mirror assembly 506 directs laser beams to predetermined locations based on control signals from the computer 508. As shown, the mirror assembly 506 directs the laser beam 509 toward the exothermal reactive layer 112 to ignite the layer 112 for forming the bonding joint 700 between the interconnect member 90 and the cell terminal 154. The laser beam 509 has a power density of $0.1 \times 10^8$ Watts/cm$^2$ to $5.0 \times 10^8$ Watts/cm$^2$ at the exothermal reactive layer 112. Further, the mirror assembly 506 directs the laser beam 513 toward the exothermal reactive layer 116 to ignite the layer 116 for forming the bonding joint 702 between the cell terminals 154, 164. The laser beam 513 has a power density of $0.1 \times 10^8$ Watts/cm$^2$ to $5.0 \times 10^8$ Watts/cm$^2$ at the exothermal reactive layer 116. Further, the mirror assembly 506 can direct a third laser beam 511 towards the exothermal reactive layer 110 to ignite the exothermal reactive layer 110, and direct a fourth laser beam 515 towards the exothermal reactive layer 114 to ignite the exothermal reactive layer 114. In one exemplary embodiment, the mirror assembly 506 is a galvanic mirror assembly. In an alternative embodiment, the mirror assembly 506 is a scanning mirror assembly.

The electrostatic discharge device 507 may be optionally utilized instead of the laser 504 and the mirror assembly 506 to ignite the exothermal reactive layers. In particular, the electrostatic discharge device 507 emits electrical sparks or discharges in response to control signals from the computer 508 to ignite the exothermal reactive layers.

Figure 12:
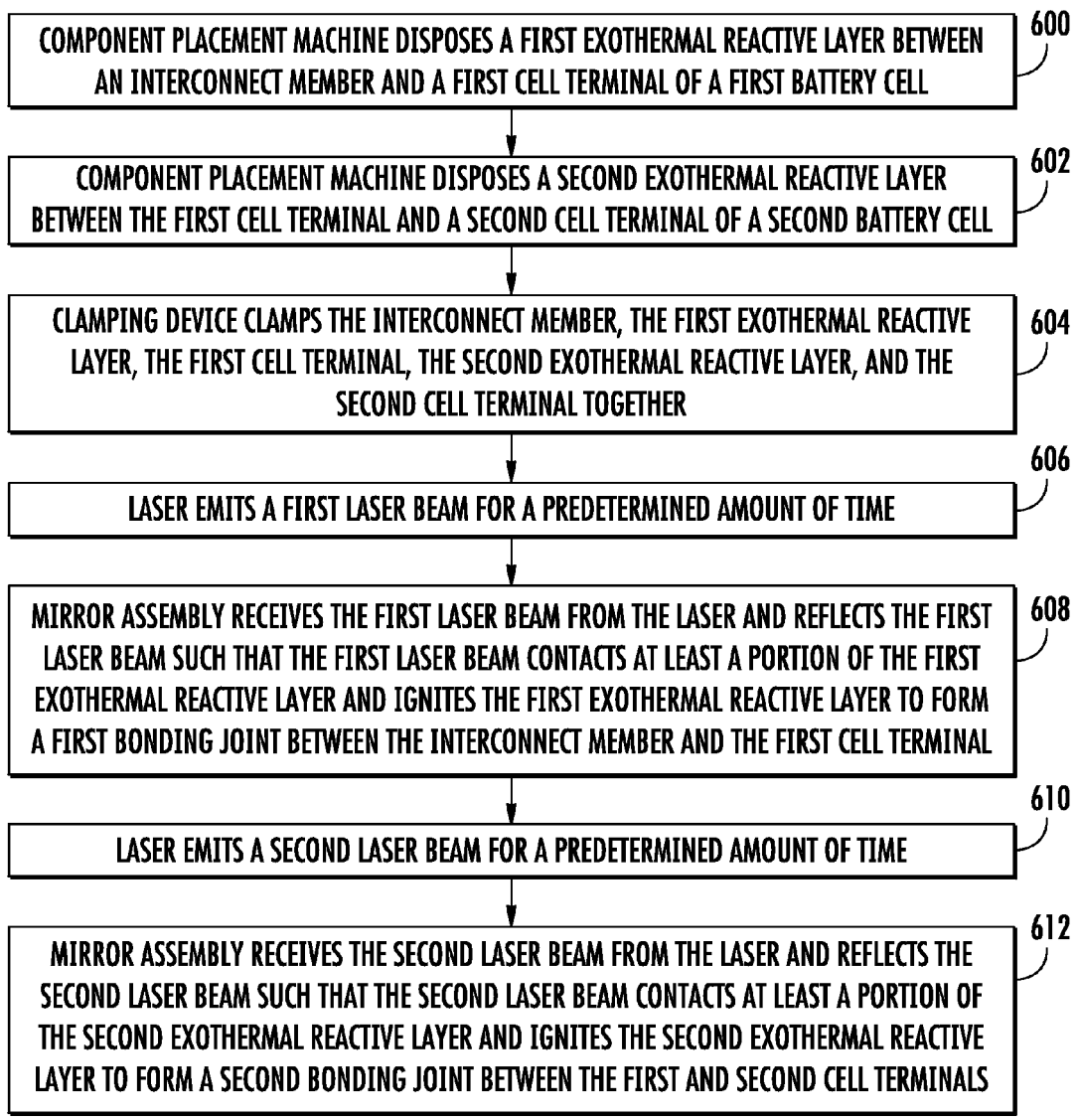
FIG. 12 is a flowchart of a method for bonding first and second cell terminals of first and second battery cells, respectively, together in accordance with another exemplary embodiment.
Figure 13:
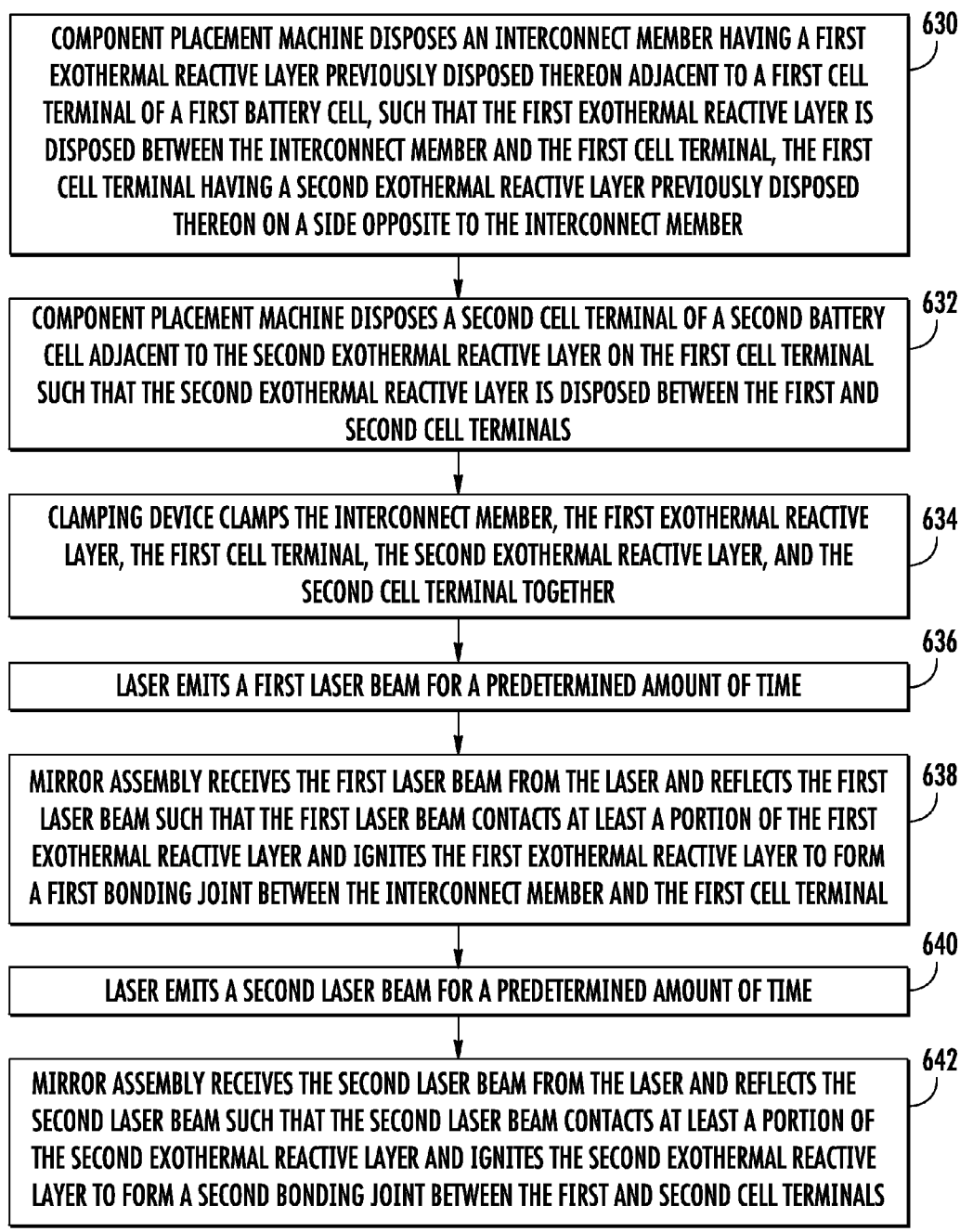
FIG. 13 is another flowchart of a method for bonding first and second cell terminals of first and second battery cells, respectively, together in accordance with another exemplary embodiment.

Referring to FIGS. 11 and 12, a flowchart of a method for bonding cell terminals of the battery together and for bonding the cell terminals to an interconnect member in accordance with another exemplary embodiment will be explained. It should be understood that the following method can be iteratively performed to bond additional cell terminals of the battery together and to bond the cell terminals to other interconnect members. During the explanation of the following method, it is assumed that the exothermal reactive layers 112, 116 are separate distinct components prior to assembly of the battery module 10.

At step 600, the component placement machine 502 disposes the exothermal reactive layer 112 between the interconnect member 90 and the cell terminal 154 of the battery cell 24.

At step 602, the component placement machine disposes the exothermal reactive layer 116 between the cell terminal 154 and the cell terminal 164 of the battery cell 26.

At step 604, the clamping device 501 clamps the interconnect member 90, the exothermal reactive layer 112, the cell terminal 154, the exothermal reactive layer 116, and the cell terminal 164 together.

At step 606, the laser 504 emits a laser beam 509 for a predetermined amount of time.

At step 608, the mirror assembly 506 receives the laser beam 509 from the laser 504 and reflects the laser beam 509 such that the laser beam 509 contacts at least a portion of the exothermal reactive layer 112 and ignites the exothermal reactive layer 112 to form the bonding joint 700 between the interconnect member 90 and the cell terminal 154.

At step 610, the laser 504 emits the laser beam 513 for a predetermined amount of time.

At step 612, the mirror assembly 506 receives the laser beam 513 from the laser 504 and reflects the laser beam 513 such that the laser beam 513 contacts at least a portion of the exothermal reactive layer 116 and ignites the exothermal reactive layer 116 to form the bonding joint 702 between the cell terminals 154, 164.

Referring to FIGS. 11 and 15, a flowchart of a method for bonding cell terminals of the battery together and for bonding the cell terminals to an interconnect member in accordance with another exemplary embodiment will be explained. It should be understood that the following method can be iteratively performed to bond additional cell terminals of the battery together and to bond the cell terminals to other interconnect members. During the explanation of the following method, it is assumed that the exothermal reactive layer 112 is previously formed on an outer surface of the interconnect member 90 utilizing a vapor deposition method or a magnetron sputtering method for example. Further, it is assumed that the exothermal reactive layer 116 was previously formed on the cell terminal 154.

At step 630, the component placement machine 502 disposes the interconnect member 90 having the exothermal reactive layer 112 previously disposed thereon adjacent to the cell terminal 154 of the battery cell 24, such that the exothermal reactive layer 112 is disposed between the interconnect member 90 and the cell terminal 154. The cell terminal 154 has the exothermal reactive layer 116 previously disposed thereon on a side opposite to the interconnect member 90.

At step 632, the component placement machine 502 disposes the cell terminal 164 of the battery cell 26 adjacent to the exothermal reactive layer 116 on the cell terminal 154 such that the exothermal reactive layer 116 is disposed between the cell terminals 154, 164.

At step 634, the clamping device 501 clamps the interconnect member 90, the exothermal reactive layer 112, the cell terminal 154, the exothermal reactive layer 116, and the cell terminal 164 together.

At step 636, the laser 504 emits the laser beam 509 for a predetermined amount of time.

At step 638, the mirror assembly 506 receives the laser beam 509 from the laser 504 and reflects the laser beam 509 such that the laser beam 509 contacts at least a portion of the exothermal reactive layer 112 and ignites the exothermal reactive layer 112 to form the bonding joint 700 between the interconnect member 90 and the cell terminal 154.

At step 640, the laser 504 emits a laser beam 513 for a predetermined amount of time.

At step 642, the mirror assembly 506 receives the laser beam 513 from the laser 504 and reflects the laser beam 513 such that the laser beam 513 contacts at least a portion of the exothermal reactive layer 116 and ignites the exothermal reactive layer 116 to form the bonding joint 702 between the cell terminals 154, 164.

The battery module 10 and the methods disclosed herein provide substantial advantages over other methods. In particular, the battery module 10 and methods provide a technical effect of utilizing exothermal reactive layers that are ignited utilizing a laser beam during manufacture of the module 10 to bond cell terminals of the battery cells together extremely quickly (e.g., less than 0.5 seconds).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

I claim:

1. A battery module, comprising:
a first battery cell having a first body portion, a first extension portion, and a first cell terminal; the first extension portion extending from the first body portion in a first direction, the first cell terminal extendin from the first extension portion in the first direction, the first cell terminal having a first cell terminal portion extending in the first direction, the first cell terminal portion having a first flat side, fhe first cell terminal portion further having a first end disposed a first distance from the first extension portion;
a second battery cell having a second body portion, a second extension portion, and a second cell terminal; the second extension portion extending from the second body portion in the first direction, the second cell terminal extending from the second extension portion in the first direction, the second cell terminal having a second cell terminal portion extending in the first direction, the second cell terminal portion having a second flat side, the second cell terminal portion further having a second end disposed a second distance from the second extension portion, the second flat side of the second cell terminal portion being disposed substantially parallel to the first flat side of the first cell terminal portion and being spaced apart from the first flat side; and
an exothermal reactive layer disposed between the first and second flat sides of the first and second cell terminal portions, respectively, and contacting the first and second flat sides a top end of the exothermal reactive layer being disposed a third distance from the first and second ends of the first and second cell terminal portions, respectively, in the first direction, and an open region being located between the first and second cell terminal portions and extending from the top end of the exothermal reactive layer to the first and second ends of the first and second cell terminal portions, respectively; the exothermal reactive layer having first and second sides, the first side being disposed adjacent to the first cell terminal portion, the second side being disposed adjacent to the second cell terminal portion, the exothermal reactive layer being configured to ignite to form a bonding joint between the first and second cell terminals in response to a laser beam propagating through the open region and contacting at least the top end of the exothermal reactive layer;
the exothermal reactive layer having at least first, second, and third aluminum layers and at least first and second nickel layers; the first, second, and third aluminum layers being constructed entirely of aluminum; the first and second nickel layers being constructed entirely of nickel; the first nickel layer being disposed between the first and second aluminum layers, the second nickel layer being disposed between the second and third aluminum layers, the first side of the exothermal reactive cell being the first aluminum layer of the plurality of aluminum layers, and the first cell terminal being an aluminum cell terminal, the second side of the exothermal reactive layer being the third aluminum layer of the plurality of aluminum layers, and the second cell terminal being an aluminum cell terminal.

2. The battery module of claim 1, wherein a thickness of the exothermal reactive layer is 40-200 microns.

3. The battery module of claim 1, wherein the third distance is greater than a thickness of the exothermal reactive layer in a second direction substantially perpendicular to the first direction.

4. The battery module of claim 1, wherein the first cell terminal further includes third and fourth cell terminal portions, the third cell terminal portion being coupled to and extending from the first extension portion of the first battery cell and being substantially parallel to the first cell terminal portion, the fourth cell terminal portion being coupled to the first and third cell terminal portions and being disposed substantially perpendicular to the first and third cell terminal portions.

5. A battery module, comprising:
a first battery cell having a first body portion, a first extension portion, and a first cell terminal; the first extension portion extending from the first body portion in a first direction, the first cell terminal extending from the first extension portion in the first direction, the first cell terminal having a first cell terminal portion extending in the first direction, the first cell terminal portion having a first flat side, the first cell terminal portion further having a first end disposed a first distance from the first extension prtion;
a second battery cell having a second body portion, a second extension portion, and a second cell terminal the second extension portion extending from the second body portion in the first direction, the second cell terminal extending from the second extension portion in the first direction, the second cell terminal having a second cell terminal portion extending in the first direction, the second cell terminal portion having a second flat side, the second cell terminal portion further having a second end disposed a second distance from the second extension portion, the second flat side of the second cell terminal portion being disposed substantially parallel to the first flat side of the first cell terminal portion and being spaced apart from the first flat side; and
an exothermal reactive layer disposed between the first and second flat sides of the first and second cell terminal portions, respectively, and contacting the first and second flat sides; a top end of the exothermal reactive layer being disposed a third distance from the first and second ends of the first and second cell terminal portion respectively, in the first direction, and an open region being located between the first and second cell terminal portions and extending from the top end of the exothermal reactive layer to the first and second ends of the first and second cell terminal portions, respectively; the third distance being greater than a thickness of the exothermal reactive layer in a second direction substantially perpendicular to the first direction, the exothermal reactive layer having first and second sides, the first side being disposed adjacent to the first cell terminal portion, the second side being disposed adjacent to the second cell terminal portion, the exothermal reactive layer being configured to ignite to form a bonding joint between the first and second cell terminals in response to a laser beam propagating through the open region and contacting at least the top end of the exothermal reactive layer;
the exothermal reactive layer having at least first, second, and third nickel layers and at least first and second aluminum layers; the first, second, and third nickel layers being constructed entirely of nickel; the first and second aluminum layers being constructed entirely of aluminum; the first aluminum layer being disposed between the first and second nickel layers, the second aluminum layer disposed between the second and third nickel layers ,the first side of the exothermal reactive layer being the first nickel layer of the plurality of nickel layers and the first cell terminal being a nickel-plated copper cell terminal, the second side of the exothermal reactive layer being the third nickel layer of the plurality of nickel layers and the second cell terminal being a nickel-plated copper cell terminal.

6. The battery module of claim 5, wherein a thickness of the exothermal reactive layer is 40-200 microns.

7. The battery module of claim 5, wherein the first cell terminal further includes third and fourth cell terminal portions, the third cell terminal portion being coupled to and extending from the first extension portion of the first battery cell and being substantially parallel to the first cell terminal portion, the fourth cell terminal portion being coupled to the first and third cell terminal portions and being disposed substantially perpendicular to the first and third cell terminal portions.

8. A battery module, comprising:
a first battery cell having a first body portion, a first extension portion, and a first cell terminal; the first extension portion extending from the first body portion in a first direction, the first cell terminal having first, second, and third cell terminal portions, the first and second cell terminal portions extending in the first direction and being substantially parallel to one another, the second cell terminal portion being coupled to and extending from the first extension portion, the third cell terminal portion being coupled to the first and second cell terminal portions and extending substantially perpendicular to the first and second cell terminal portions, the first cell terminal portion extending from the third cell terminal portion in the first direction and having a first end disposed a first distance from the first extension portion;
a second battery cell having a second body portion, a second extension portion, and a second cell terminal; the second extension portion extending from the second body portion in the first direction, the second cell terminal extending from the second extension portion in the first direction, the second cell terminal having a fourth cell terminal portion extending in the first direction, the fourth cell terminal portion having a second end disposed a second distance from the second extension portion, the fourth cell terminal portion being disposed substantially parallel to the first cell terminal portion and being spaced apart from the first cell terminal portion; and
an exothermal reactive layer disposed between the first and fourth cell terminal portions and contacting the first and fourth cell terminal portions; a top end of the exothermal reactive layer being disposed a third distance from the first and second ends of the first and fourth cell terminal portions, respectively, in the first direction, and an open region being located between the first and fourth cell terminal portions and extending from the top end of the exothermal reactive layer to the first and second ends of the first and fourth cell terminal portions, respectively, the first distance being greater than a thickness of the exothermal reactive layer in a second direction substantially perpendicular to the first direction, the exothermal reactive layer having first and second sides, the first side being disposed adjacent to the first cell terminal portion, the second side being disposed adjacent to the fourth cell terminal portion, the exothermal reactive layer being configured to ignite to form a bonding joint between the first and second cell terminals in response to a laser beam propagating through the open region and contacting at least a the top end of the exothermal reactive layer;

the exothermal reactive layer having at least first, second, and third aluminum layers and at least first and second nickel layers, the first nickel layer being disposed between the first and second aluminum layers, the second nickel layer being disposed between the second and third aluminum layers, the first side of the exothermal reactive cell being the first aluminum layer of the plurality of aluminum layers, and the first cell terminal being an aluminum cell terminal, the second side of the exothermal reactive layer being the third aluminum layer of the plurality of aluminum layers, and the second cell terminal being an aluminum cell terminal.

9. The battery module of claim 8, wherein a thickness of the exothermal reactive layer is 40-200 microns.

* * * * *